United States Patent [19]
Bouron et al.

[11] Patent Number: 5,450,459
[45] Date of Patent: Sep. 12, 1995

[54] ENCLOSURE FOR CONFINING AND COVERING A WALL AND IN PARTICULAR THE VESSEL HEAD OF A NUCLEAR REACTOR

[75] Inventors: Norbert Bouron, Acheres; Claude Falduti, Saint-Michel-Sur-Orge, both of France

[73] Assignee: Framatome, Courbevoie, France

[21] Appl. No.: 197,605

[22] Filed: Feb. 17, 1994

[30] Foreign Application Priority Data

Feb. 17, 1993 [FR] France ................ 93 01795

[51] Int. Cl.[6] .............................................. G21C 13/10
[52] U.S. Cl. ........................... 376/250; 376/203;
 376/289; 73/49.3
[58] Field of Search ............... 376/203, 205, 245, 250,
 376/260, 263, 287, 289, 463; 138/104, 147, 149;
 73/45.4, 49.2, 49.3, 52

[56] References Cited

U.S. PATENT DOCUMENTS

| | | | |
|---|---|---|---|
| 3,087,327 | 4/1963 | Kagi et al. | 376/250 |
| 3,462,345 | 8/1969 | Jabsen | 376/203 |
| 3,977,939 | 8/1976 | Frisch et al. | 376/263 |
| 4,070,221 | 1/1978 | Anthony | 376/205 |
| 4,406,855 | 9/1983 | Schwiers et al. | 376/250 |
| 4,528,454 | 7/1985 | Baatz et al. | 376/272 |
| 4,708,843 | 11/1987 | Desfontaines et al. | 376/289 |
| 5,225,150 | 7/1993 | Malandra et al. | 376/287 |

FOREIGN PATENT DOCUMENTS

| | | |
|---|---|---|
| 2098239 | 3/1972 | France . |
| 2921707 | 12/1980 | Germany . |
| 3027510 | 2/1982 | Germany . |
| 828468 | 2/1960 | United Kingdom . |
| 891353 | 3/1962 | United Kingdom . |
| 1139406 | 1/1969 | United Kingdom . |

Primary Examiner—Daniel D. Wasil
Attorney, Agent, or Firm—Pollock, Vande Sande & Priddy

[57] ABSTRACT

The confining and covering enclosure (10) comprises a heat-insulating wall (13, 14) designed to insulate thermally the outer surface (2a) of the vessel head (2). The heat-insulating wall (13, 14) is leaktight to the fluid coming from the vessel of the reactor in the case of leakage and comprises leaktight connection seals (15, 27) at the outer surface (2a) of the head and at the adaptors (6) serving to delimit a chamber (30) for confinement and for recovery of leakage gases.

10 Claims, 6 Drawing Sheets

ENCLOSURE FOR CONFINING AND COVERING A WALL AND IN PARTICULAR THE VESSEL HEAD OF A NUCLEAR REACTOR

FIELD OF THE INVENTION

The invention relates to an enclosure for confining and for covering a surface of a receptacle or of a duct enclosing a pressurized fluid at high temperature and in particular a leaktight enclosure for confining and for covering the convex upper surface of the head of the vessel of a pressurized water nuclear reactor.

BACKGROUND OF THE INVENTION

Pressurized water nuclear reactors generally comprise a vessel enclosing the core of the reactor which is immersed in pressurized water for cooling the reactor.

The generally cylindrical vessel of the reactor comprises a head in the form of a spherical cap which is added onto its upper part, so that the head presents a convex outer upper surface. The head is pierced with apertures at the level of each of which is secured by welding, in vertical position, a tubular penetration piece constituting an adaptor ensuring the passage of an extension of a cluster for adjusting the reactivity of the core or the passage of a measurement means to the interior of the core such as a column of thermocouples.

Each of the tubular penetration pieces is engaged in an aperture passing through the head of the vessel and is welded onto the concave lower surface of the head by an annular weld.

The adaptors intended to receive an extension of a cluster for adjusting the reactivity of the core have an upper part projecting above the head of the vessel onto which is secured a control mechanism serving to move the extension securely attached to the control cluster termed control rod.

Inspections carried out on the nuclear reactors in service have shown that some of the adaptors passing through the head of the vessel have cracks, after a certain head operating time, in particular in the weld zone of the adaptors, in the vicinity of the concave lower surface of the head. These cracks are liable to develop until they pass right through the wall of the adaptor. In this case, a limited but troublesome leakage of primary fluid constituted by pressurized water may occur, to the outside of the head, through the crack and the space included between the adaptor and the passage aperture of the head. The pressurized water constituting the leakage liquid which is at very high temperature and which finds itself depressurized evaporates, with the result that an escape of steam occurs above the head. The steam carries away certain radioactive fission products which are liable to be found again in the atmosphere above the vessel of the nuclear reactor.

It is necessary to detect very quickly the presence of an adaptor for passage through the head of the vessel having a crack right through it leading to a leakage of primary fluid, in order to effect a repair after shutting down the nuclear reactor in order to prevent the release of gaseous radioactive substances into the enclosure for confinement of the nuclear reactor.

In order to prevent a major transfer of heat between the head of the vessel which is at high temperature and the control mechanisms disposed at the upper part of the adaptors, and in order to protect the latter from too high a temperature, an envelope termed casing in heat-insulating material is placed above and caps the head of the vessel, inside a cylindrical skirt surrounding the adaptors.

So that the casing can be engaged between the adaptors, it is constituted by detachable modular members which, assembled, form a cylindrical envelope with a circular horizontal plane at the upper part. The casing thus constituted is pierced with large apertures so that in position on the head of the vessel it does not ensure leaktightness around the adaptors. The casing does not therefore produce any confinement serving to retain or possibly to detect leakage gases above the head of the vessel.

When the casing is constructed from members such as panels inserted between the adaptors and assembled to each other, these panels are not connected to one another in a leaktight manner, with the result that the casing does not provide any improvement where safety and the monitoring of leaks is concerned.

In a more general way, when a receptacle or pipeline receiving a fluid at high temperature and possibly at high pressure is surrounded by an enclosure or envelope in heat-insulating material, this envelope or enclosure does not serve to confine or to retain a gas which may escape from the receptacle or from the duct in the case of leakage. Neither does the envelope or enclosure serve to detect leakage in the vicinity of the outer surface of the receptacle or of the pipeline in the thermally insulated zone.

SUMMARY OF THE INVENTION

It is an object of the invention to propose an enclosure for confining and covering an outer surface of a receptacle or of a duct enclosing a fluid at high temperature, comprising a heat-insulating wall designed to insulate thermally the surface of the receptacle or of the pipeline and serving to ensure the retention of a gas which may escape from the receptacle or from the pipeline in case of leakage and the detection of the leakage gas in the vicinity of the outer surface covered by the heat insulation.

For this purpose, the heat-insulating wall is leaktight to the fluid coming from the receptacle or from the pipeline in case of leakage and comprises means, leaktight to the fluid, for connection with the outer surface, so as to delimit with this outer surface a chamber for confinement and recovery of fluid.

Preferably, the enclosure is constituted by modular members such as panels which are assembled among themselves with interposition of leaktight seals. The enclosure may also comprise a means for sampling leakage gas in the recovery chamber connected to a detection means.

BRIEF DESCRIPTION OF THE DRAWINGS

In order to give a clear understanding of the invention, an enclosure for confining and for covering the convex outer surface of the head of the vessel of a pressurized water nuclear reactor will now be described, by way of example, with reference to the accompanying.

DETAILED DESCRIPTION

Figure 1:
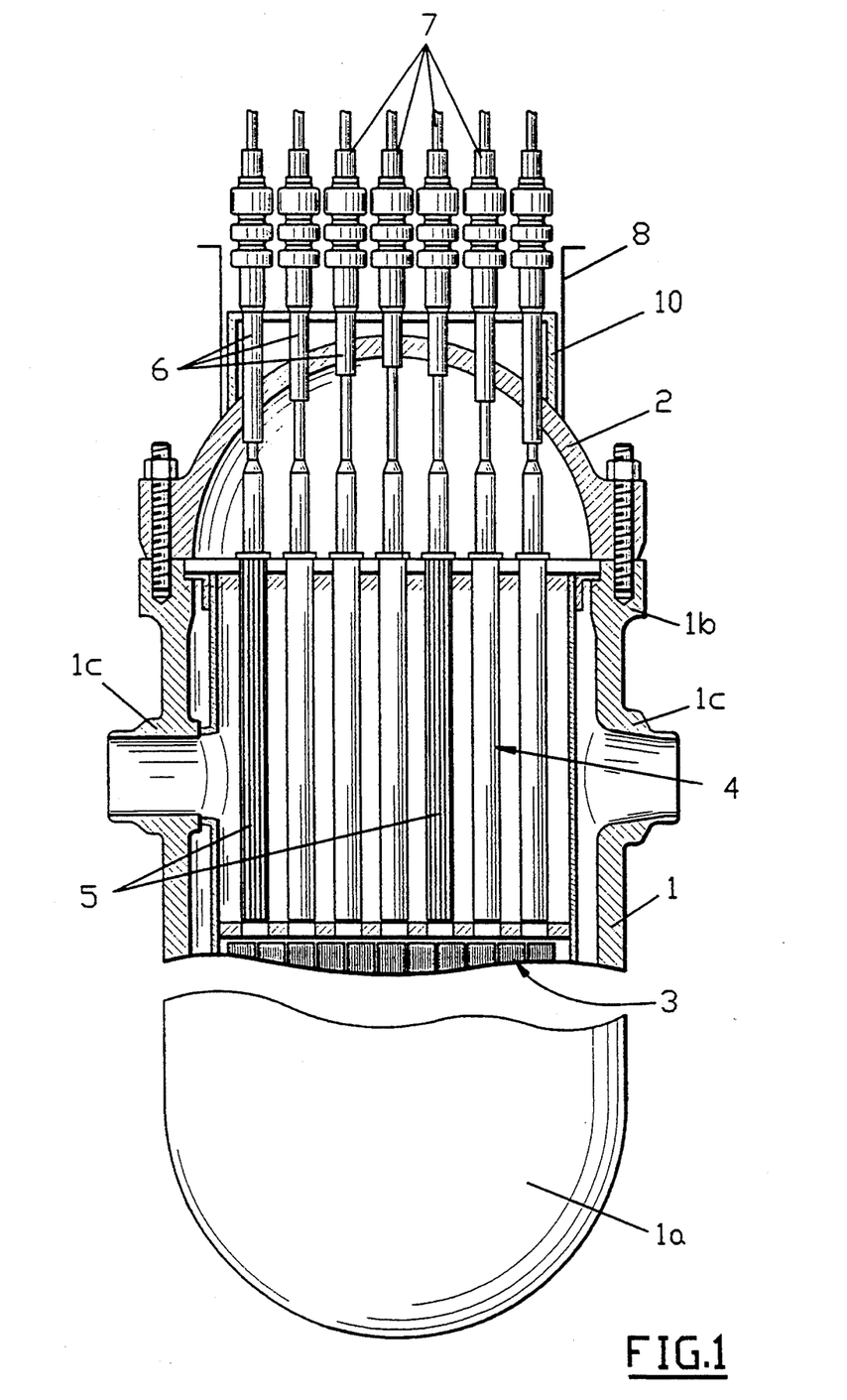
FIG. 1 is a view in section through a vertical plane of the entire vessel of a pressurized water nuclear reactor comprising a head covered by an enclosure according to the invention.

FIG. 1 shows the vessel 1 of a nuclear reactor which is constituted by a tubular envelope of great thickness closed at its lower part by a domed bottom 1a and which comprises at its upper part a flange 1b designed to receive the hemispherical head 2 of the vessel which is secured in a leaktight manner onto the vessel 1 when the reactor is in service.

The vessel 1 comprises a set of pipes 1c which serve to connect the internal volume of the vessel and the primary circuit of the reactor, so that the pressurized water for cooling the reactor enters the vessel and leaves the latter through the intermediary of the pipes 1c.

The pressurized water comes into contact with the core 3 of the reactor constituted by fuel assemblies disposed inside the vessel.

Above the core 3 of the reactor are disposed upper internals 4 serving to ensure the guiding of control clusters or rods 5 which can be inserted into some assemblies of the core in order to regulate the reactivity, depending on the power required of the nuclear reactor.

The control clusters 5 are secured at the end of extensions which pass through the head of the vessel 2 inside penetration adaptors 6.

Onto the upper part of the adaptors 6 are secured control mechanisms 7 which interact with the extensions so as to ensure the displacement of the control clusters 5 in the vertical direction.

The set of the adaptors 6 passing through the head of the vessel 2 is disposed inside a skirt 8 of metal plate (termed skirt of the vessel head).

A heat-insulating envelope or casing 10 is disposed above the convex outer surface of the head 2, in the passage zone of the adaptors 6, inside the skirt 8.

Figure 2:
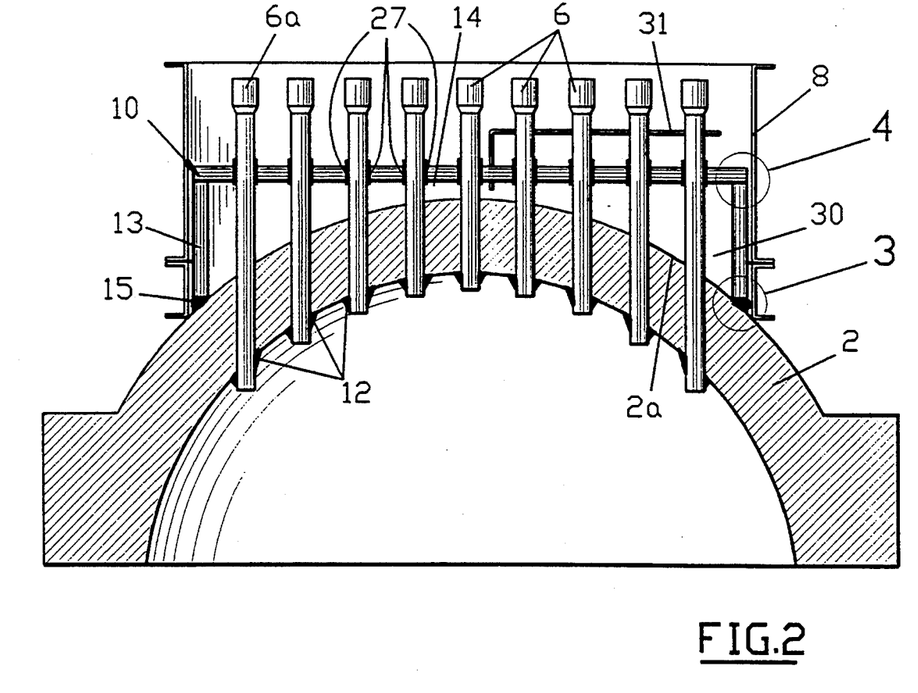
FIG. 2 is a view in section on a larger scale through a vertical plane of the head of the vessel shown in FIG. 1 and of the confinement enclosure.

Reference will now be made to FIG. 2 in order to describe in more detail the head 2, the passage adaptors 6 and the covering enclosure 10.

The adaptors 6 are constructed in tubular form and are each engaged inside an aperture passing through the head 2 of the vessel 1 in the axial direction of the vessel. Each of the adaptors 6 is secured on the vessel head, in the vicinity of its concave inner surface, by a weld 12.

Each of the adaptors 6 comprises a widened upper part 6a on which comes to be mounted a corresponding control mechanism (not shown in FIG. 2).

The set of the adaptors 6 passes through the head of the vessel, in a substantially circular central zone around which is placed a skirt 8 of metal plate resting on the convex upper surface of the head 2.

The enclosure 10 according to the invention which is disposed inside the skirt 8 in a coaxial disposition with respect to the skirt 8 comprises a cylindrical lateral wall 13 and a flat upper plate 14 of circular shape. The upper plate 14, which is generally constructed in modular manner, as will be explained later, delimits a network of apertures in each of which is engaged a tubular adaptor 6.

Figure 3:
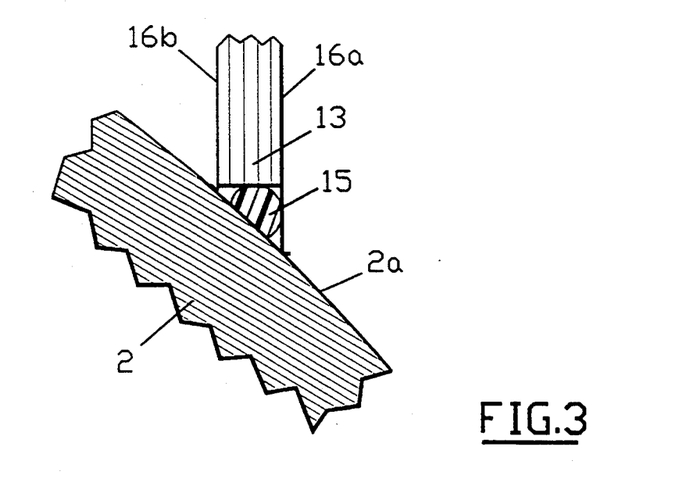
FIG. 3 is a view on a larger scale of detail 3 of FIG. 2.

As can be seen in FIG. 3, the tubular lateral wall 13 of cylindrical shape rests on the convex upper surface 2a of the vessel head 2 through the intermediary of an annular seal 15 engaged in a housing delimited by the lower parts of two tubular sleeves 16a and 16b delimiting the heat-insulating wall 13 outwardly and inwardly respectively.

The heat-insulating lateral wall 13 is constituted by the two coaxial sleeves 16a and 16b in stainless steel sheet between which are interposed corrugated plates of stainless steel, juxtaposed in relation to one another, so as to constitute an alveolate assembly between the outer and inner walls 16a and 16b ensuring a good thermal insulation.

Figure 4:
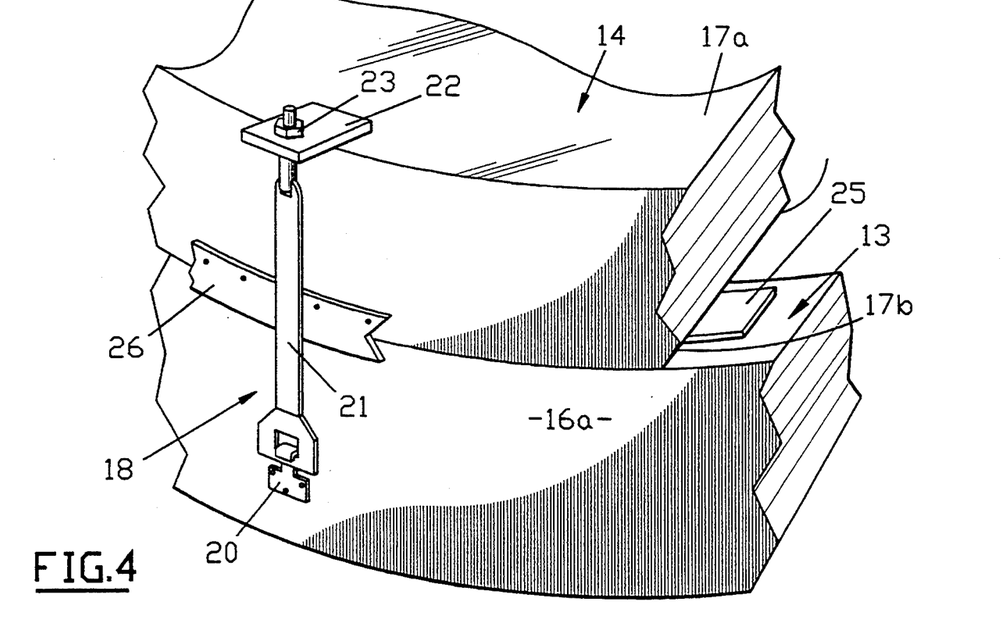
FIG. 4 is a view in perspective of detail 4 of FIG. 2 showing a means for joining two walls of the enclosure.

As can be seen in FIG. 4, the upper wall 14 of the enclosure of circular shape is constituted by plates of stainless steel 17a and 17b parallel with one another between which are stacked and interposed thin corrugated sheets of stainless steel, designed to constitute an alveolate structure for insulation.

The surfaces of the walls 13 and 14 are bright and serve to reflect radiation.

As can be seen in FIG. 4, the flat upper wall 14 is secured onto the upper edge of the annular wall 13, by a set of tightening devices 18 distributed over the periphery of the wall 13 and of the plate 14. One of these tightening devices 18 is shown in FIG. 4. This device 18 comprises a fitting 20 for hooking onto the outer sleeve 16a of the wall 13, a tension device 21 comprising a rod threaded at its end, a tightening plate 22 and a nut 23 screwed onto the threaded end part of the rod of the tensioner 21 and coming to bear against the tightening plate 22.

A seal 25 of flat annular shape is interposed between the upper surface of the wall 13 and the peripheral part of the lower surface of the plate 14.

The devices 18 ensure at the same time the assembly of the wall 13 to the wall 14 and the gripping of the seal 25.

A butt-strap 26 is disposed in the joint zone between the walls 14 and 13, at the outer periphery of this joint zone.

As can be seen in FIG. 2, annular seals 27 are disposed around each of the adaptors 6, in its part passing through the wall 14. The seals 27 ensure the leaktightness of the passage of the adaptors through the wall 14.

When the heat-insulating enclosure 10 rests on the convex upper surface 2a of the head 2, as shown in FIG. 2, the seal 15 is compressed between the lower part of the lateral wall 13 and the vessel head, under the effect of the weight of the enclosure.

The seal 25 ensuring leaktightness between the walls 13 and 14 is gripped by the devices 18 and the leaktight passage of the adaptors 6 through the wall 14 is ensured by the seals 27 gripped onto the outer surfaces of the adaptors.

Because of this, the enclosure 10 delimits with the upper surface 2a of the head 2, inside the skirt 8, a chamber 30 isolated from the external environment. In the case where one of the adaptors 6 has a crack, for example at the level of a weld zone 12, pressurized water filling the vessel of the nuclear reactor is liable to infiltrate into the crack and the passage aperture of the adaptor in the vessel head, to vaporize and escape above the upper surface 2a of the head 2. In this case, the enclosure 10 ensures the retention of the leakage gases escaping at the level of the adaptor having a crack.

A tube 31 passing through the wall 14 in a leaktight manner at one of its ends and connected at its other end to a detection device (not shown) serves to sample air contained in the chamber 30 and to ensure the detection of a radioactive gas possibly contained therein.

In the case where a radioactive gas, such as xenon, which is formed in the reactor vessel is disclosed in the sample, the presence of a leak at the level of one of the adaptors 6 is deduced therefrom.

The cluster control mechanisms secured onto the adaptors 6 are cooled by a circulation of air inside the skirt 8.

The presence of the confinement enclosure 10 serves to prevent the radioactive gases passing through the head of the vessel in case of leakage at the level of an adaptor from being carried away by the cooling air.

The enclosure 10 therefore serves to effect in a very efficient manner the confinement of gases from possible leakage above the head 2 and the detection of these leakage gases coming from inside the reactor vessel.

Figure 5:
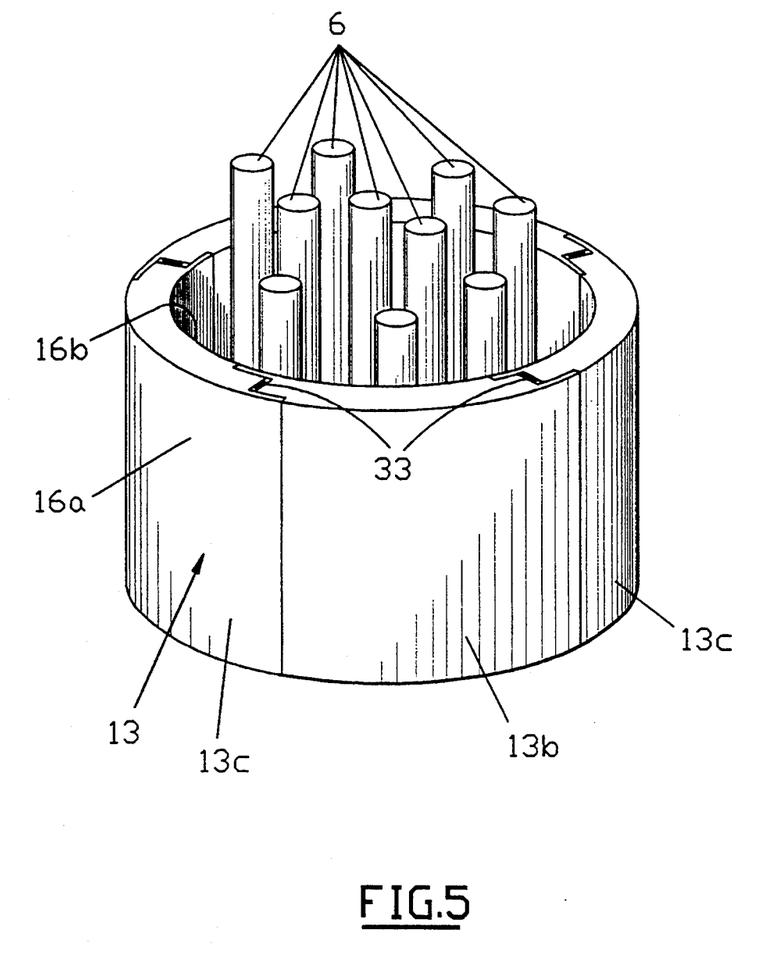
FIG. 5 is a schematic view in perspective of the lateral wall of the enclosure disposed around adaptors passing through the head of the vessel.

FIG. 5 shows a preferred embodiment of the annular lateral wall 13 of the enclosure 10. The annular wall 13 is constituted by cylindrical sectors such as 13a, 13b, 13c, connected to one another along zones delimited by generatrices with interposition of seals 33 disposed in the directions of the generatrices.

Figure 6:
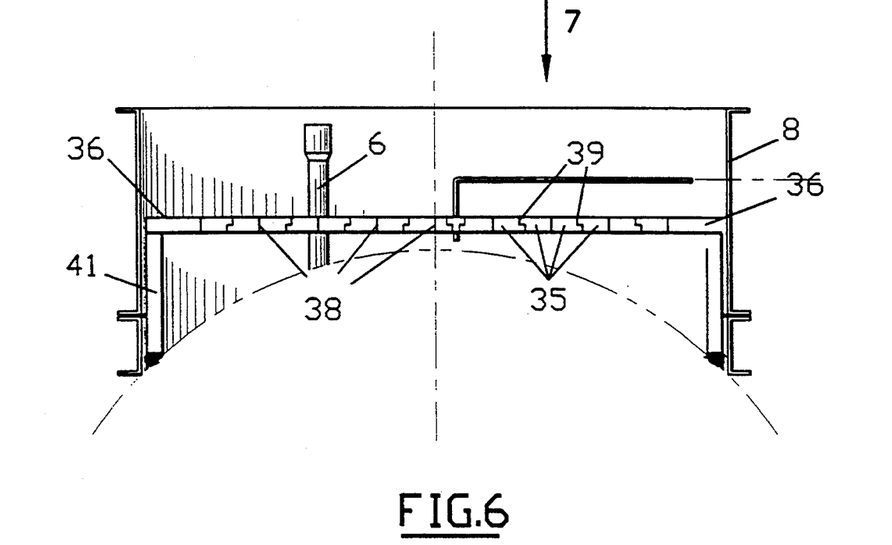
FIG. 6 is a view in section of an enclosure constructed in modular form from heat-insulating panels.
Figure 7:
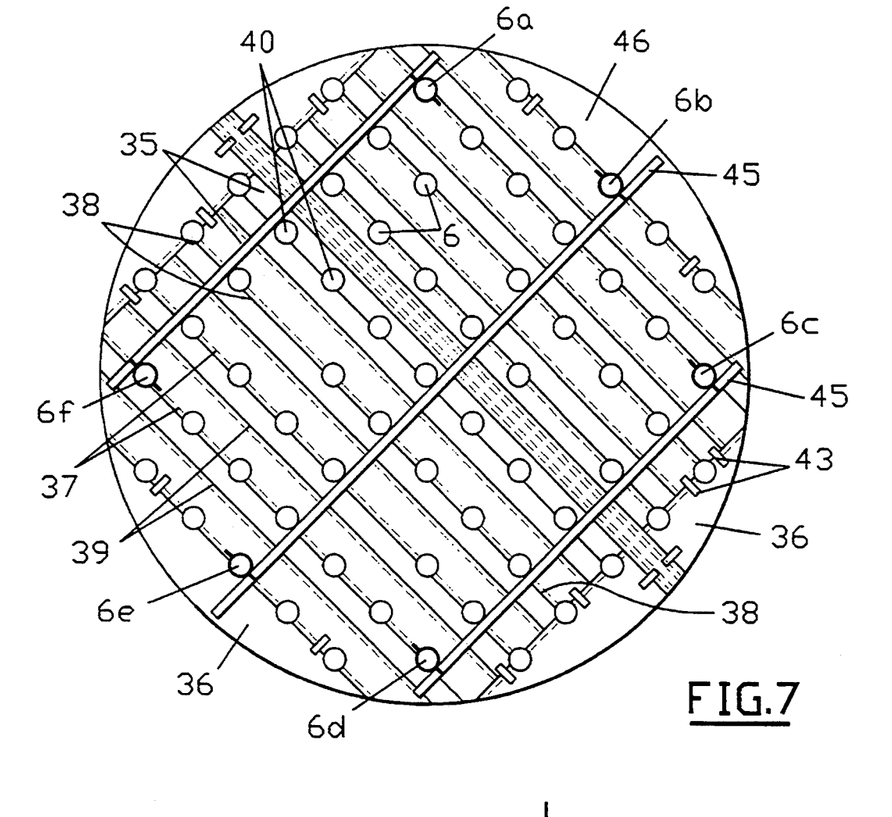
FIG. 7 is a plan view in the direction of arrow 7 of FIG. 6.

FIGS. 6 and 7 show a preferred embodiment of the upper plate 46 of an enclosure of circular shape comprising a peripheral wall 41 of cylindrical shape.

The wall 46 is constituted by panels 35 of heat-insulating material in the form of rectangular elongate strips, juxtaposed and added against one another along their large sides and by panels of heat-insulating material 36 in the form of circular sectors added against the ends of the panels 35 or against the longitudinal edges of the two panels 35 disposed towards the outside of the wall 46.

Each of the heat-insulating panels 35 and 36 is constituted in the same manner as the wall 14 described above and shown in FIG. 4.

The lateral faces of the panels added against one another are covered with a flat sheet of stainless steel so as to ensure a good bearing of the edges of the panels against the seals 37 interposed between each of the edges of panels added against one another.

As can be seen in FIG. 6, some of the edges of panels 38 are totally flat edges and other edges of panels 39 added against one another have complementary step shapes.

Figure 9:
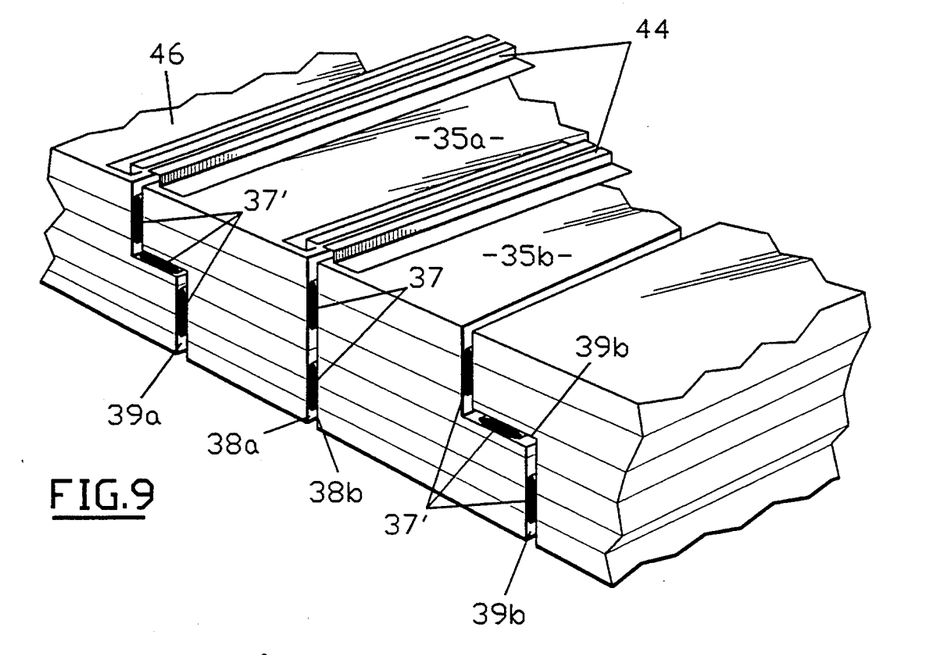
FIG. 9 is a view in perspective of panels of the enclosure shown in FIGS. 6 and 7.

FIG. 9 shows two adjacent panel 35a and 35b added against one another through the intermediary of flat edges 38a and 38b between which are interposed one or more seals 37 constituted by a flat strip.

The panels 35a and 35b additionally comprise step-shaped outer edges 39 ensuring the joining of the panels 35a and 35b with two other immediately adjacent panels.

Seals 37' are interposed on each of the flat parts of the step-shaped joints 39a and 39b.

As can be seen in FIGS. 6 and 7, the flat joint faces 38 of the panels 35 delimit housings 40 for a set of adaptors 6 aligned in a row in the longitudinal direction of the panels 35.

For the whole of the wall 46, the panels 35 provide 77 passage apertures for the 77 adaptors passing through the head of the vessel of the pressurized water nuclear reactor.

The panels 35 are engaged on the adaptors 6 disposed in a row, at the time of their fitting in order to constitute the wall 46, through the intermediary of the apertures constituting the circular passages 40. The seals are interposed between the edges of the panels and the adaptors so as to ensure a leaktight joint between the panels and the adaptors. The seals 37 are also interposed between the flat portions of the edges of the panels between the passages 40 of the adaptors.

Some of the panels rest at their ends on the upper edges of the lateral wall 41 of tubular shape which can be constructed in a manner similar to the lateral wall 13 shown in FIG. 5 and engaged inside the skirt 8 mounted on the vessel head.

Other panels are connected at their ends by attachment devices 43 to the end panels 36 in the form of circular sectors.

The edges of the panels comprising stepped surfaces do not comprise any apertures for passage of adaptors and are engaged on a corresponding edge of an adjacent panel, as shown in FIG. 9.

Profiled butt-straps 44 are secured onto the upper surface of the wall 46, at the level of each of the rectilinear seals between the panel edges.

Anti-lifting beams 45 are secured by bolting, in the vicinity of their ends onto the peripheral adaptors such as 6a, 6b, 6c, 6d, 6e and 6f shown in FIG. 7.

The anti-lifting beams 45 could equally be secured at their ends onto the skirt 8 surrounding the adaptors and disposed above the head.

Figure 8:
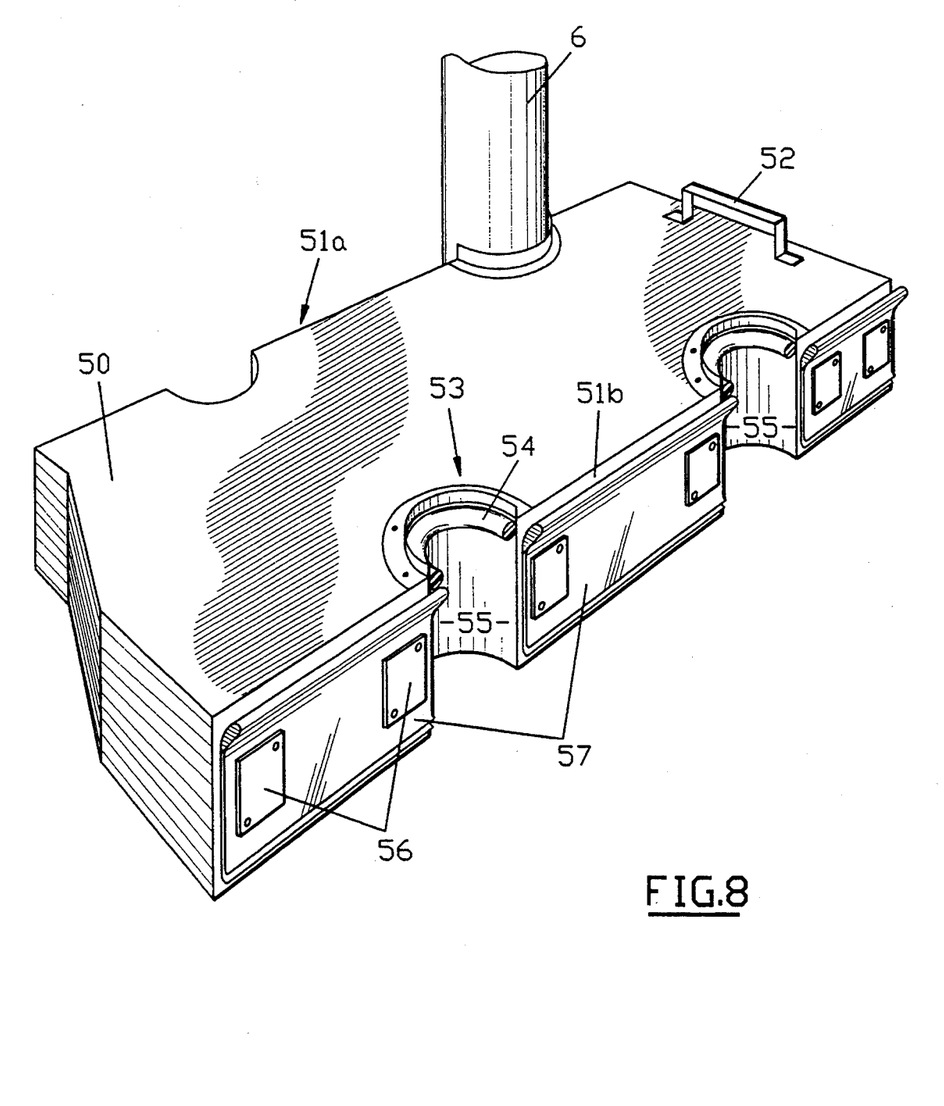
FIG. 8 is a view in perspective of a variant embodiment of a panel of the enclosure shown in FIGS. 6 and 7.

FIG. 8 shows a panel 50, according to a variant embodiment in which the panel has a width corresponding to the distance between two successive rows of adaptors 6.

In this embodiment, the panel 50 comprises two edges 51a and 51b constituted by flat faces in which are provided semi-cylindrical apertures 55 at the level of each of the adaptors 6 of the rows situated on either side of the panel 50.

The panel 50 is constructed in the same manner as the panels 35 shown in FIGS. 6, 7 and 9 and as the wall 14 shown in FIG. 4. The panel 50 is a heat-insulating panel comprising two parallel plates of stainless steel between which are interposed corrugated leaves of stainless steel constituting an alveolate mass of thermal insulation.

On each of the flat edges 51a and 51b, between the semi-cylindrical apertures for passage of the adaptors 6, are secured leaktight seals 57, through the intermediary of attachment plates 56 screwed onto the faces 51a and 51b of the panel 50.

The seals 57 are constructed in the form of flat strips comprising a rounded and widened upper edge constituting a sealing lip.

Panels adjacent to the panels 50 can be added along the edges 51a and 51b, these panels comprising flat edges in which are provided semi-cylindrical apertures in positions corresponding to the positions of the adaptors 6 which come to be applied against the sealing lips of the seals 57 during the fitting and the assembly of the adjacent panels onto the panel 50.

The semi-cylindrical apertures of the adjacent panels matched up constitute housings 55 for the adaptors 6.

Into each of the housings 55 is inserted an O-ring seal 54 maintained by a flange 53 screwed onto the two panels in adjacent position.

The O-rings 54 ensure leaktight passage of the adaptors 6 through the penetration apertures 55.

The panels 50 may comprise handles 52 for handling and for transport at their ends in order to facilitate their installation.

Each of the panels 50 which is fitted between two successive rectilinear rows of adaptors 6 has a length such that the panel comes to rest at its ends on a cylindrical lateral wall surrounding the set of the adaptors and constituting the upper wall of the confinement enclosure.

The panels constructed in self-supporting form and resting by their ends on the lateral wall have a length in the vicinity of 3.5 m for the longest among them.

The panels 50 are secured onto the cylindrical lateral wall by screw-type attachment devices as shown in FIG. 4 and serve to place in compression a seal between the panels 50 and the lateral wall.

The seal interposed between the lower part of the lateral wall and the head such as the seal 15 shown in FIG. 3, the seals between the lateral wall and the upper wall of the enclosure as also the seals between the panels constituting the walls and between the adaptors and the panels, in the embodiments which have been described above, must be constructed ot a material which is compatible on the metallurgical and chemical plane with the material constituting the vessel and the surrounding structures. Furthermore, these seals must withstand temperatures as high as 350° C.

Such seals may be constructed in one of the following materials:
braided glass fibers,
braided ceramic fibers,
envelope of glass fabric packed with loose glass fibers,
envelope of ceramic fibre packed with loose ceramic fibers,
metal braid in 18.9 or 18.10 austenitic stainless steel,
braid of glass fibers in which is incorporated a spring of stainless steel,
flexible strips of austenitic stainless steel,
silicone seal (in the case where the maximal operating temperature of the seals does not exceed 270° C.).

The connection of the panels is ensured by mechanical attachments providing resilient compression of the seals or the maintaining of these seals in the case of sheading seals. It is necessary to ensure relative movements of the panels in order to absorb thermal expansions of the panels constituting the heat insulation, expansions of the vessel head and movements of the adaptors in relation to the panels due to thermal expansions.

The panels constituting the upper wall of the enclosure may easily be removed for access to the head or to the adaptors during maintenance operations. The replacement of the panels into position and their initial fitting are also facilitated owing to the design of the panels and of their means of attachment.

A network of pipes can be provided mounted or arranged on the internal surface of the upper wall of the enclosure, this network of pipes being connected to a sampling pipe such as the pipe 31 shown in FIG. 2 and comprising an assembly of sampling apertures, opening into the chamber 30 provided between the enclosure 10 and the vessel head, and distributed over the upper internal surface of the enclosure. Unitary samples are thus taken at a large number of points above the head, so that the detection of a leakage gas at the level of an adaptor is executed in a very sure and very rapid manner.

The sampling network or else a second network similar to the sampling network may be used in order to perform the injection of a gas into the chamber 30, for example a gas charged with a radioactive element, such as nitrogen 13 serving to carry out monitoring and calibration of the detection equipment.

The confining and covering enclosure according to the invention therefore serves to delimit a substantially leaktight chamber above the head capable of collecting and of retaining the leakage gases coming from inside the reactor vessel.

The operational safety of the nuclear reactor is thus improved in a simple and inexpensive manner.

In addition, the heat insulation of the convex upper surface of the vessel head is substantially improved and the air for cooling and for flushing the mechanisms of the adaptors is not liable to come into contact with the upper surface of the vessel head. The panels or modular members constituting the enclosure confining and covering the head of the vessel of a nuclear reactor may have shapes different from those described.

It is equally possible to use materials different from those which have been described for constituting the heat-insulation panels.

The invention is not limited to the construction of an enclosure disposed above the head of the vessel of a pressurized water nuclear reactor and can be applied to the construction of any enclosure for confinement of at least part of the outer surface of any receptacle or pipeline containing a fluid capable, in the case of leakage through the wall of the receptacle or of the pipeline, of giving rise to the escape of a leakage gas.

We claim:

1. Enclosure for confining and covering an outer surface of a receptacle enclosing a fluid at high temperature, said enclosure comprising a heat-insulating wall constituted by modular wall members assembled with one another with the interposition of seals and means for connection of said heat insulating wall with an outer surface of said receptacle so that said wall delimits with said outer surface of said receptacle a leaktight sealed chamber for confining and recovering fluid in case of leakage of said receptacle.

2. Enclosure according to claim 1, comprising means for sampling gas inside said chamber.

3. Enclosure according to claim 1, for confining and covering a convex upper surface of a domed head of a vessel of a pressurized water nuclear reactor, through which pass tubular adaptors each comprising a part projecting above said upper surface of said head of said vessel, a mechanism for moving a control rod being secured to an end of said part, said heat insulating wall of the enclosure comprising a tubular heat-insulating lateral wall resting on said upper surface of said head of said vessel through first sealing means and surrounding said tubular adaptors of said head, and a heat-insulating upper wall mounted on an upper part of a lateral wall underneath said mechanisms, said upper wall being constituted by flat panels assembled to one another along edges of said panels with interposition of second sealing means, at least part of said edges delimiting apertures for passage of said adaptors through third sealing means ensuring leak-tightness of the passage of said adaptors through said upper wall.

4. Enclosure according to claim 3, wherein each of said panels comprises a flat first lateral connection face and a step-shaped second lateral connection face, the penetration apertures for said adaptors being made in the flat connection faces of said panels.

5. Enclosure according to claim 3, wherein each of said panels comprises two flat opposed lateral connection faces in which are made apertures for penetration of said adaptors.

6. Enclosure according to claim 3, comprising a network for sampling fluid at a plurality of points on a lower surface of said upper wall.

7. Enclosure according to claim 3, comprising at least two beams mounted on said adaptors or on a fixed skirt surrounding said adaptors for maintaining said flat panels.

8. Enclosure according to claim 3, wherein said first, second, third and fourth seals are made of materials selected from the group consisting of braided glass fibers, braided ceramic fibers, a glass fabric envelope packed with loose glass fibers, a ceramic fiber envelope packed with loose ceramic fibers, and a metal braid of austenitic stainless steel.

9. Enclosure according to claim 3, wherein said first, second, third and fourth seals are made of materials selected from the group consisting of a braid of glass fibers in which is incorporated a stainless steel spring, flexible strips of austenitic stainless steel, and silicone.

10. Enclosure according to claim 1, wherein said modular wall members comprise external layers of stainless steel sheet between which is interposed an alveolate stack of leaves of stainless steel.

* * * * *